United States Patent
Ouimette et al.

(10) Patent No.: US 8,873,720 B1
(45) Date of Patent: Oct. 28, 2014

(54) RECORDING CONTACT CENTER CALLS IN VARIOUS CONSENT CONTEXTS

(71) Applicant: Noble Systems Corporation, Atlanta, GA (US)

(72) Inventors: Jason P. Ouimette, Atlanta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/766,462

(22) Filed: Feb. 13, 2013

(51) Int. Cl.
*H04M 1/64* (2006.01)
*H04M 3/42* (2006.01)

(52) U.S. Cl.
CPC ................. *H04M 3/42221* (2013.01)
USPC ............ 379/85; 379/93.12; 379/266.1

(58) Field of Classification Search
USPC ............ 379/265.01–266.1, 85, 93.12
See application file for complete search history.

(56) References Cited

U.S. PATENT DOCUMENTS

| | | | | |
|---|---|---|---|---|
| 6,988,205 | B2 * | 1/2006 | Walker et al. | 713/193 |
| 7,227,930 | B1 * | 6/2007 | Othmer et al. | 379/85 |
| 8,077,832 | B2 * | 12/2011 | Othmer et al. | 379/85 |
| 8,136,026 | B2 * | 3/2012 | Commarford et al. | 715/200 |
| 8,315,374 | B2 | 11/2012 | Perlmutter | |
| 8,422,641 | B2 * | 4/2013 | Martin, II | 379/88.08 |
| 8,477,915 | B1 * | 7/2013 | Vasquez et al. | 379/88.23 |
| 2005/0147228 | A1 * | 7/2005 | Perrella et al. | 379/265.06 |
| 2012/0027189 | A1 * | 2/2012 | Shaffer et al. | 379/142.1 |

OTHER PUBLICATIONS

Noble Systems Corporation, Maestro 2010.1.1 User Manual, vol. 1, Aug. 17, 2010, 454 pages, Noble Systems Corporation, Atlanta, GA.

* cited by examiner

*Primary Examiner* — Simon Sing

(57) ABSTRACT

Various embodiments of the invention provide methods, systems, and computer-program products for determining whether and how to record voice calls, or portions thereof, for calls processed by a contact center. Calls can be classified as being in a context that is either single-party consent or dual-party consent depending on whether the call is inter-state or intra-state and which state(s) are involved. In one embodiment, the contact center may access tables that indicate for a telephone number whether the call involves a state that adheres to a single-party consent regime or a dual-party consent regime. A speech analytics system may further be used to ascertain whether aural consent is provided by the remote party, or whether the agent properly requested and responded to the remote party's response. Depending on the context, all parties, one party, or no parties may be recorded.

17 Claims, 7 Drawing Sheets

RECORDING CONTACT CENTER CALLS IN VARIOUS CONSENT CONTEXTS

BACKGROUND

Contact centers may receive and/or originate communications with remote parties for various reasons. In some instances these communications may involve emails, webchats, texts, or other forms of character-based digital communications. In order for an agent to act on the content of such messages, the messages must be digitally processed and displayed to the agent, which inherently includes storage of the digital content in computer-readable form. The communication content may be stored as text strings, files, etc. The content can be received, stored, and then displayed to agents at subsequent times when needed. The inherent storage of such communications makes it easy to subsequently review the subject matter to confirm or verify the exchange of information that occurred.

When communication involves voice calls, the calls may be processed in real time without any long-term storage of the content. Verification of the original conversation is difficult unless the voice call was recorded. Thus, it is often desirable to record voice conversations in a contact center to allow verification of the subject matter and to confirm that the agent involved followed various internal policies.

The technology used to record voice calls is readily available, inexpensive, and flexible. What is more complex is interpreting the various state and federal statutes governing when calls may be legally recorded. These statutes define various conditions before voice recording is allowed. Generally speaking, if all parties on the call provide consent, then recording is allowable. However, there are exceptions for various conditions when recording can occur without express consent and these may depend in part on the state where the call is originating and/or terminating.

Some state laws allow voice calls to be recorded if only one party provides consent. These are called "single-party consent" states. Other state laws allow calls to be recorded only if all parties have provided consent. These are called "dual-party consent" or "multi-party consent" states. For intra-state calls, the law of the applicable state can be applied, but for inter-state calls, it is not always clear which one of a particular state's rules govern the recording of the voice call, if at all.

Determining for a given call whether it can be legally recorded is difficult, and the laws have not always kept pace with recent technologies. For example, in the past, calls made to a landline based telephone number allowed easy determination as to what state the call was directed to. However, with telephone number portability, knowing the telephone number does not necessarily indicate what state the number is based in. Similarly, if the called number is a wireless number, the number itself may not necessarily represent which state the called party is located in. Thus, improved approaches are needed for recording voice calls in various contexts. It is with respect to these considerations and others that the disclosure herein is presented.

BRIEF SUMMARY

In general, embodiments of the present invention provide computer-program products, methods, systems, apparatus, and computing entities directed to recording voice calls in a contact center. In one embodiment, calls may be recorded based on a determination of the consent context. The consent context may depend on the type of call, e.g., intra-state or inter-state, as well as whether consent from the remote party is obtained. In some embodiments, consent may be provided explicitly or implicitly by the remote party. Further, in some embodiments, consent may be provided implicitly from the remote party continuing the call after receiving notification that the call is being recorded.

In other embodiments, a speech analytics system may monitor the call to determine whether explicit consent is provided to record the call. The speech analytics system, in certain embodiments, may control whether the recording of the call occurs based on analyzing the speech. In certain embodiments, the speech from both parties of the call may be recorded or only the speech of the agent in the contact center may be recorded. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
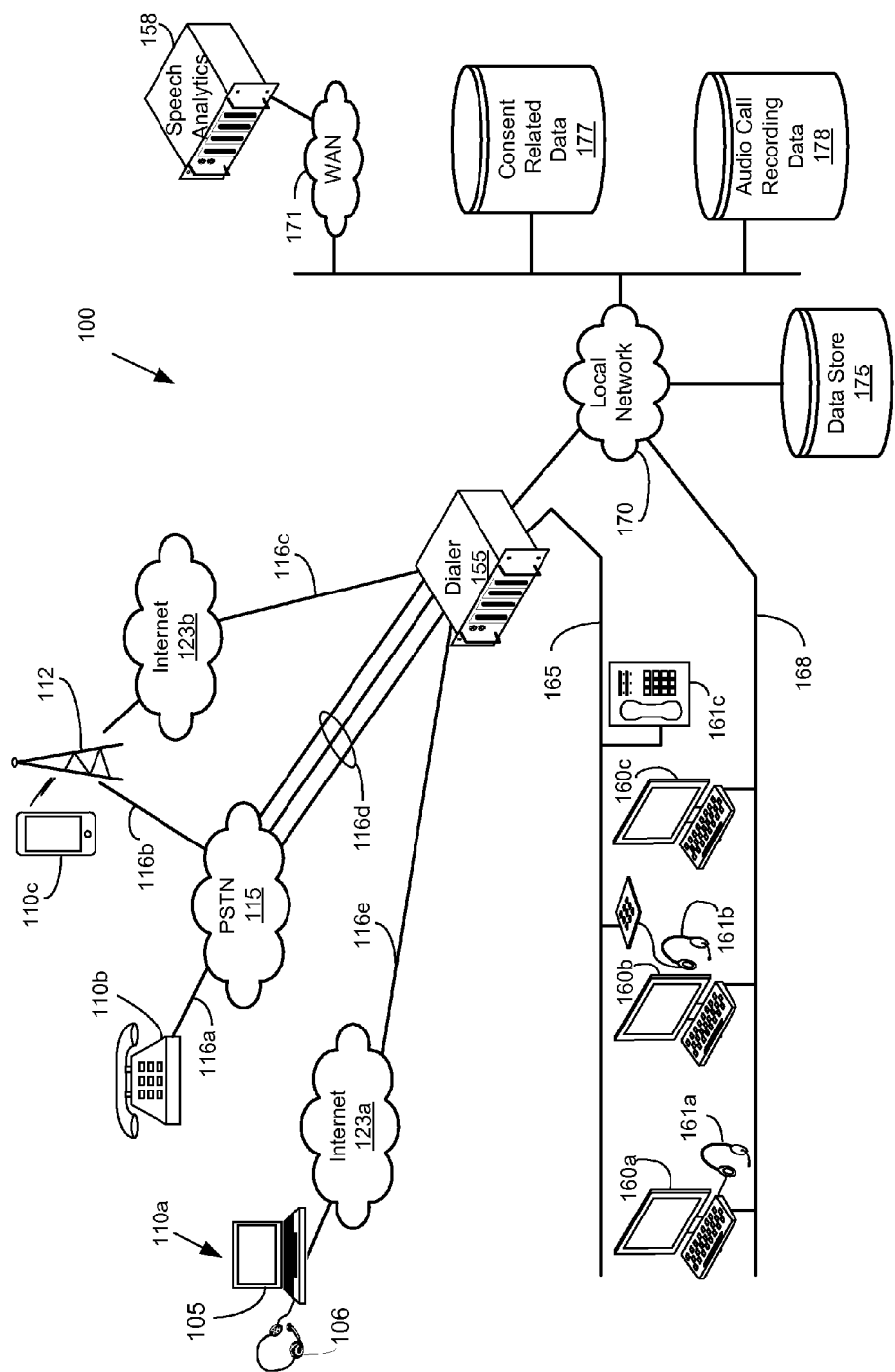
FIG. 1 illustrates one embodiment of a contact center architecture capable of employing the concepts and technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 shows one embodiment of a contact center architecture 100 illustrating the various technologies disclosed herein. Although many aspects of contact center operation are disclosed in the context of voice calls, the contact center may process other forms of communication such as facsimiles, emails, text messages, video calls, chat messages, and others. The term "party" without any further qualification refers to a live person (as opposed to an answering machine or voice mail service) associated with an instance of communication processed by the contact center. The term "remote party" refers to an individual that originates calls into the contact center, or is contacted by the contact center.

The contact center shown in FIG. 1 may process voice calls originated by a dialer 155. The dialer 155 is typically configured to dial a list of telephone numbers to initiate outbound calls. The list of telephone numbers may be stored in a data store 175 that is accessible using a local network 170. The dialer 155 may directly interface with voice trunks using facilities 116*d* to the PSTN 115 for originating calls. After the calls are originated, a transfer operation by the dialer 155 may connect the call with an agent, or place the call in a queue for a next available agent. In the latter case, announcements or music may be provided to the party.

The dialer may record calls and store the associated audio data in a data store 178. The data therein may be analyzed by a speech analytics system ("SAS") 158 to determine the content of the audio in non-real time. The SAS can also function to analyze voice calls in real time. If so, the SAS may not operate on stored audio call data in the data store 178, but on audio data in the dialer 155 or other component. Further, the dialer 155 may access various recording consent related data stored in a consent data store 177. The consent related data may comprise one or more tables indicating for a given state which consent procedures apply. The consent related data may also comprise written consent provided by individuals previously. Thus, calls made by the dialer 155 to remote parties may have previously received consent regarding call recording.

Outbound voice calls may originate to parties using a variety of phone types. A party may receive a call at a conventional analog telephone 110*b* connected to a public switched telephone network ("PSTN") 115 using an analog plain old telephone service ("POTS") line 116*a*. The call may be routed by the PSTN 115 and may comprise various types of facilities 116*d*, including, but not limited to: T1 trunks, SONET based fiber optic networks, ATM networks, or PSTN trunks 116*d*.

Voice calls may also be received at a mobile device 110*c*, such as a smart phone or tablet, which wirelessly communicates with a mobile service provider ("MSP") 112. The voice calls may be routed to the PSTN 115 using an integrated services digital network ("ISDN") interface 116*b* or other types of interfaces that are well known to those skilled in the art. The MSP 112 may also route calls as packetized voice, referred to herein as voice-over-IP ("VoIP") to an Internet provider 123*b* using Internet-based protocols. For convenience, unless indicated otherwise, the term "trunk" refers to any type of facility 116*c*, 116*d*, or 116*e* providing voice calls to, or from, the contact center, regardless of the type of protocol or technology used. Specifically, a "trunk" as referred to herein is not limited to time-division multiplexing ("TDM") technology.

Voice calls may also be received by a party employing a so-called "IP phone," "VoIP phone," or "soft phone" 110*a*. In one embodiment, this device may comprise a computing device 105, such as a laptop, desktop, or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123*a*, such as a cable company providing Internet access services over a coaxial cable facility 116*e*. Those skilled in the art will recognize that a variety of protocols and facilities may be used to convey voice calls.

Calls may be routed over facilities 165 or 168 to agents for servicing. That is, after a call is originated by the dialer 155 and a called party answers, the call may be connected with an agent. The physical area at which the agent sits is often referred to as an agent "position" and these positions are often grouped into clusters that are managed by a supervisor, who may monitor calls and the agents' productivity. An agent usually uses a computing device, such as a computer 160*a*-160*c* and a voice device 161*a*-161*c*. The combination of computer and voice device may be referred to as a "workstation." Thus, the workstation collectively has a data capability and a voice capability, though separate devices may be used. In some instances, "workstation" may be used in reference to specifically either the data or voice capability at the agent's position, as appropriate to the context. For example, "routing the call to the agent's workstation" means routing a call to one of the voice devices 161*a*-161*c* at the agent's position. Similarly, "routing the call to the agent" means routing a call to the appropriate equipment at an agent's position.

The voice device used by an agent may be a soft phone device exemplified by a headset 161*a* connected to the computer 160*a*. The soft phone may be a virtual telephone implemented in part by an application program executing in a computer. The phone may also comprise an Internet Protocol ("IP") based headset 161*b* or a conventional phone 161*c*. Use of the term "phone" is intended to encompass all these types of voice devices used by an agent, unless indicated otherwise.

After completing a call, the dialer 155 may generate call record data that is stored in a data store 175 and the data store may include a database. The call record data indicates the progress and status of the call. The call record data may indicate the time the call was originated, the number dialed, disposition, when the call was answered, whether an answering machine was encountered, etc. In some embodiments, this may be integrated with the call records in the data store 175. Further, in some embodiments, separate recordings of the calls may be stored as audio call data in a data store 178 and this data store may include a database. Consent related data, including previously provided consent to record the call, may also be stored in a data store 177.

The audio call data may be analyzed to ensure that agents properly handled the calls, to verify if agents followed the appropriate procedures, and to evaluate agent performance, etc. The audio call data may be transferred to the SAS 158 via a wide area network ("WAN") 171 or the Internet, which may process the audio call data off-site. In some embodiments, the SAS 158 may be offered as a service by another entity, and remotely located from the contact center.

The contact center may also field incoming calls by an automatic call distributor ("ACD") (not shown). In this embodiment, the functionality of the dialer 155 may be replaced with an ACD that accepts and routes incoming calls to the various agent. Other combinations may involve both incoming and outgoing calls.

Although the above components may be variously referred to as a "computer" "processing device," "unit," "component" or "system" and may incorporate therein a local data store or database, or interface with an external database. Use of the word "server" herein does not require the component to interact in a client-server arrangement using web-based protocols with other components, although that may be the case. Further, the above components may be located remotely from (or co-located with) other components. Furthermore, one or more of the components may be implemented on a single processing device to perform the functions described herein.

In addition, the contact center architecture 100 may be provided as a hosted solution, where the call processing functionality is provided as a communication service (a so-called "communication as a service" or "CaaS") to a contact center operator. Thus, there is no requirement that the components identified above must be actually located or controlled by a contact center operator. In some embodiments, the agents can be remotely located from the other components of the contact center, and may also be remotely located from each other, sometimes referred to as a "virtual contact center."

Those skilled in art will recognize FIG. 1 represents one possible configuration of a contact center architecture 100, and that variations are possible with respect to the protocols, configurations, facilities, technologies, and equipment used. For example, the speech analytics system 158 may be accessed via the LAN 170 instead of the WAN 171, and the consent related data may be integrated with the dialer 155. Other variations on the physical configurations are possible.

Statutory Landscape Surrounding Call Recording

As noted earlier, there are various federal and state laws that may govern the recording of telephone calls. Many states allow recording of calls between two parties within the same state (e.g., intra-state) if there is consent to record the call from one party. These are referred to as "single-party consent" states. Other states require consent from all the parties on a call. These are referred to as "dual-party consent" or "multi-party" consent states. Typically, if there are more than two parties on a call, all parties must provide consent before the conversation may be legally recorded. Many states also have judicial rulings that have generated exceptions and interpretations modifying the scope of their call recording statutes. For example, some statutes may treat cordless phones differently or recognize an implicit consent after notification of recording.

For inter-state calls, it is not always clear if and/or when a respective state's laws govern, e.g., the originating state or the terminating state. Some courts have ruled that the statutes of the state where the call terminates should govern, whereas other courts have applied the rule that the state law of where the recording equipment is located should govern (which typically is in the state where the call originated). Some contact centers have attempted to avoid the application of different state laws by locating the contact centers on an Indian reservation, so that all calls are effectively considered as inter-state and governed by federal law.

Federal law generally allows single-party consent. However, the relationship between state and federal law in various situations may not always be well settled. The FCC regulations governing a telephone carrier's recording of calls indicates that interstate or international wireline conversations may not be recorded unless the use of the recording device is:

preceded by verbal or written consent of all parties to the telephone conversation; or preceded by verbal notification that is recorded at the beginning, and as part of the call, by the recording party; or accompanied by an automatic tone warning device, sometimes called a "beep tone," that automatically produces a distinct signal that is repeated at regular intervals during the course of the telephone conversation when the recording device is in use.

The above illustrates that determining whether a call may be legally recorded can be complex. Further, even the determination of whether a call is inter-state or intra-state can be complex. In the past, the area code portion of a telephone number was a reliable indicator of the state where the call terminated, but with the advent of cellular phones and number portability, the area code of a telephone number does not reliably identify the state where the party is located in.

Also, in the past, recording technologies could not distinguish between recording one party versus another on a call. However, current recording technologies easily allow recording one party of a voice call without recording the other party. It would appear axiomatic that recording a portion of a call is not the same as recording the call, but the jurisprudence may not be settled as to whether recording one party of a call is the same as recording both parties of the call.

However, there is utility in recording one party's dialogue on a call. For example, in many instances, a contact center agent is required to inform the remote party of certain information, based on the context of the call. This may be due to the policies of the contact center or as required by statutes applicable for the particular purpose of the transaction. For example, there are regulations governing the content of debt collection calls. Recording the agent's dialogue is useful to determine whether the agent followed the appropriate procedures or statutes. In other cases, a dispute may arise as to whether the agent provided certain information or misleading information to a remote party. Recording the agent's dialogue can confirm whether this occurred or not.

Recently available technologies, such as speech analytics systems ("SAS"), can analyze speech and provide an analysis of the contents of speech. Specifically, an SAS can analyze the agent's speech to determine whether an agent complied with various contact center regulations and policies. For example, with respect to recording calls, a contact center agent can be instructed to request consent from the called party at the beginning of a call. The SAS can analyze the agent's speech to ensure that consent is requested. Further, the SAS can also analyze the remote party's response to determine whether consent was provided. The SAS can then also provide an indication that controls the recording of the call or of the agent.

Processing Flows

Conceptually, there could be a myriad number of combinations of laws governing the legality of recording a voice call. First, there could be potentially fifty unique laws governing intra-state calls for each of the fifty states, but in reality, many are similar in scope. Second, there could be a myriad of inter-state combinations, with each state applying its laws. Thus, a call from State A to State B may not be treated by each state as the same as a call from State B to State A. Further, federal laws may apply for inter-state calls.

Thus, it is not practical to define processing flows for each possible situation. Further, the legal framework is subject to change. The purpose of the processing flows presented herein is to identify some of the combinations that may be applicable. Further, the processing flows presented are not intended to indicate whether or when recording in a specific context would be legal under a particular state or federal statue. It is possible that certain aspects of voice recording are not settled.

Even with all the possible combinations, some common aspects are observed. It is generally the case that if all parties consent to recording the call, then the call may be recorded. Thus, if an agent is connected to a remote party (either as an incoming or outgoing call), and consent is requested and obtained from the remote party, recording is allowed. It may be possible that implicit consent may be granted. For example, if the remote party is informed that the call is being recorded and chooses to continue with the call, implicit consent may have been granted. Some of these instances will be discussed in further depth as the processing flows are presented.

Recording of Calls

A simplistic approach to determining whether a call can be recorded is to first determine whether the call only involves states governed by single-party consent rules. Specifically, a determination is made if the call is an intra-state call occurring in a single-party consent state or is an inter-state call between two single-party consent states. If so, recording could proceed by the call originator, since they would have (presumably) provided consent and would control recording. In this context, there is no need to request consent from the other party. If the call involves a dual-consent state, then the agent could be informed of the context and be prompted via an indication on his workstation to request consent from the other party, and if granted, recording would proceed. In this instance, there are two possible outcomes: a) do not record any party, or b) record the call (e.g., speech from both parties).

Figure 2:
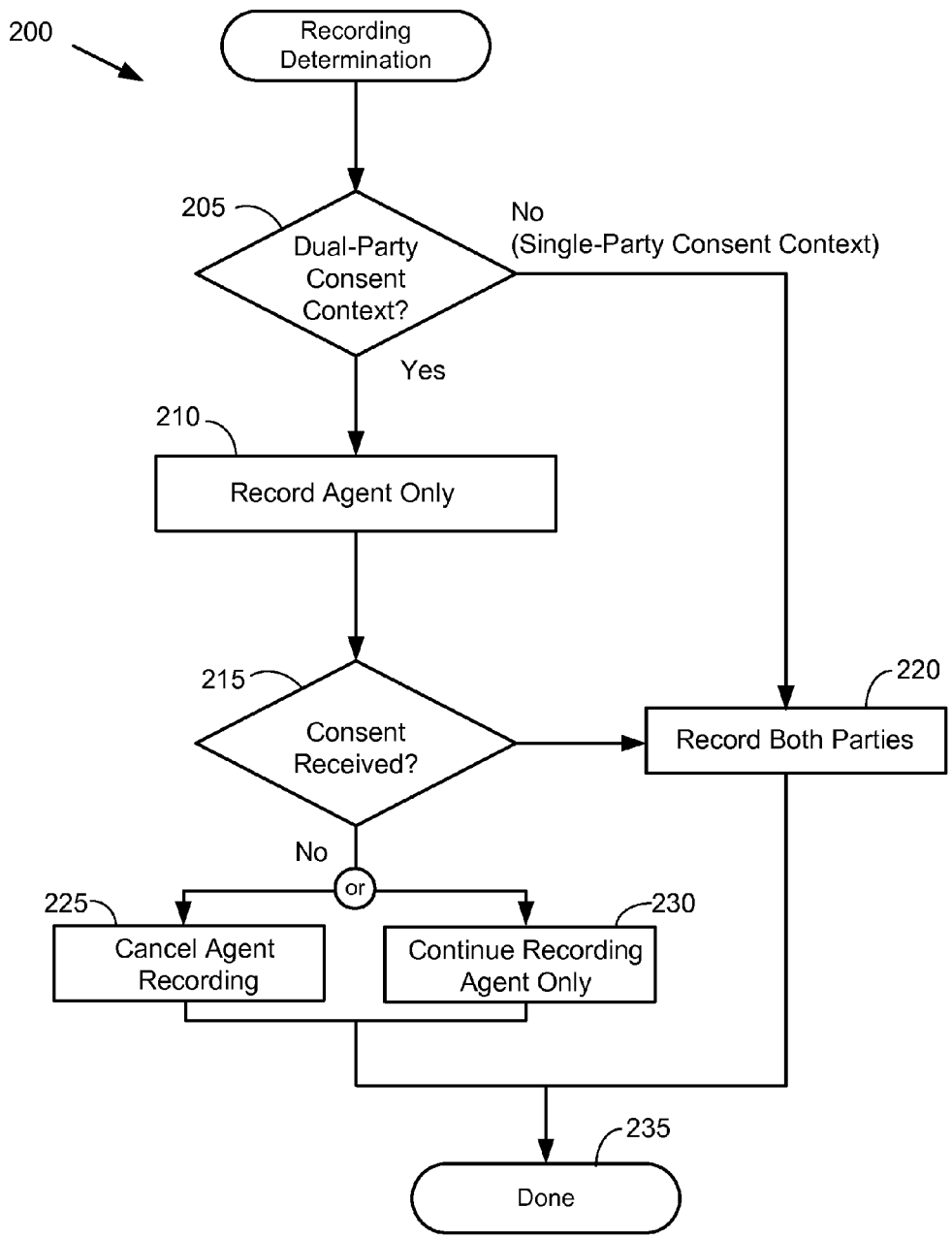
FIG. 2 illustrates one process flow for recording either both parties on a voice call or a single-party on the voice call.

FIG. 2 illustrates one embodiment of a process flow 200 that improves upon current recording methods. This involves an outcome that may record only one party, the agent. No conclusion is made as to whether this comports with state or federal telephone recording laws.

This process flow 200 applies after a connection has been established between an agent and a remote party. This established connection may be for an intra-state or inter-state call, and the call may be an inbound or outbound call with respect to the agent. A test is made in operation 205 as to whether the context of the call involves dual-party consent, e.g., whether a dual-party consent state is involved. The determination of this may be made in various ways, and may depend on the circumstances. For example, if the call is intra-state and the state is considered a single-party consent state, then the decision in operation 205 would be "no." Similarly, if the call is inter-state, but both states are single-party consent states, then the decision in operation 205 would also be "no."

If the determination from operation 205 is "no," (e.g., the context is a single-party consent), then the process flow continues to operation 220 where both parties are recorded. If, however, the determination from operation 205 is "yes," then only the agent's speech is recorded in operation 210.

The agent may be trained as part of the contact center's policy to request explicit consent from the remote party at this point in the call. If the remote party grants consent, then the process flow continues to operation 220 where both parties are recorded.

If the remote party does not consent to being recorded in operation 215, then various options are possible, two of which are shown in FIG. 2. Specifically, the recording of the agent could be canceled in operation 225. This effectively eliminates any further recording of any party associated with the call. Alternately, in operation 230 the recording of only the agent could continue. Operation 230 effectively continues the recording function as shown in operation 210. The process then completes in operation 235.

The determination of the context of a call (e.g., whether the call is a dual-party consent context or a single-party consent context) in operation 205 may involve determining the states in which the call originates and terminates. The contact center originating or receiving a call will presumably be aware of the state it is located in, and the corresponding procedures for complying with the applicable state's regulations. Frequently, the contact center will be located in a single-party consent state, as all but twelve states are single-party consent states. Thus, the more challenging determination for the contact center is determining what state the remote party is located in. These procedures may depend on whether the call is an incoming or outgoing call.

For an incoming call, the originating telephone number may be provided by the telephone carrier to the contact center as part of the incoming call signaling. The area code (or area code and central office code) portion of the telephone number may indicate a particular geographical area from which the number is based. This process may further involve determining whether the number is a wireless (e.g., cellular phone) number or a landline number. Various service providers can provide databases or services indicating for a specified telephone number whether that number is a wireline or wireless number. If the number is a wireline number, then the state can be determined using look up tables. These tables can be structured to indicate the corresponding state for a particular area code. The same table, or another table, can indicate for that state whether that state is a single-party consent or dual-party consent state. In this manner, the area code can be used to determine the consent context.

If the number is wireless, the area code may indicate a state of the wireless carrier's home mobile switching center ("MSC"), but that does not necessarily indicate where the remote party is located. The remote party may be located in another state relative to the area code of their cellular telephone number. In one embodiment, the contact center may proceed with the assumption that the state associated with the area code is the applicable state for purposes of determining the context. The aforementioned table(s) can be used to determine the particular context of the call.

In other embodiments, the telephone number may be a ported number. For example, the number may have been originally assigned to a wireline carrier, but then ported to a wireless carrier. At that point, it may have been further ported to an Internet based voice provider. At this point, it is difficult for the contact center to know where the remote party is located. However, the contact center may proceed with the assumption that the state associated with the area code is the applicable state for purposes of establishing a context.

The above procedures may be applicable for outgoing calls as well. In the case of outgoing calls, the contact center may have further information associated with the remote party, such as address information or a location identifier, indicating a state that the remote party is located in. Further, this information may be defined as overriding any determination of a state associated with the area code of the telephone number. For example, a remote party may have a wireless number assigned in Chicago, when the remote party previously lived there. The remote party may have then moved to New York but retained their Chicago-based wireless number. The contact center may have information in its call records indicating the remote party now resides in New York and that New York's consent laws apply for purpose of determining the context.

Returning to FIG. 2, as previously indicated, the provision of consent in operation 215 may be explicitly obtained from the remote party by the agent at the beginning of the call. Consent may be obtained in other ways. For instance, consent may be implicitly obtained in some circumstances. For example, a remote party calling into a contact center may encounter an announcement provided by an announcement system or an interactive voice response ("IVR") system that after answering the call indicates that the call may be recorded. Or, the remote party may hear a periodic beep, which is commonly recognized as indicating a recording is in progress. If the remote party continues with the call, this may be deemed to be implied consent.

Consent may also be provided explicitly in advance of connecting the call with the agent. For example, the remote party may have provided consent as part of a customer agreement. Consent may be obtained and documented in various forms, including selecting a checkbox on a website, for example, when the remote party applied for a charge card, or has provided written authorization via paper correspondence. Prior consent may have been provided by verbal interaction with an IVR or other similar automated system. Thus, the contact center may have obtained consent prior to connecting the call. In various embodiments, this can be ascertained for incoming calls by examining the incoming telephone number or account information provided by the caller and accessing a consent database that indicates whether prior consent has been provided. For outgoing calls, the contact center will typically have access to such customer information prior to originating the call to the remote party.

As noted above, consent may be requested by the agent and provided by the remote party. The agent may respond to the consent by interacting with a workstation to initiate recording. This can be accomplished in various ways, including by selecting a screen icon that toggles or turns on the call recording. However, this relies on the agent properly completing the task and further detracts the agent from completing other tasks associated with the call.

An automated approach can relieve the agent from this menial task. In one embodiment, this can be accomplished by using the aforementioned SAS to monitor speech between the agent and remote party to ascertain whether consent was requested by the agent and granted by the remote party. Since this typically occurs at the beginning of the call, it involves the SAS analyzing only the beginning portion of the call.

Figure 3:
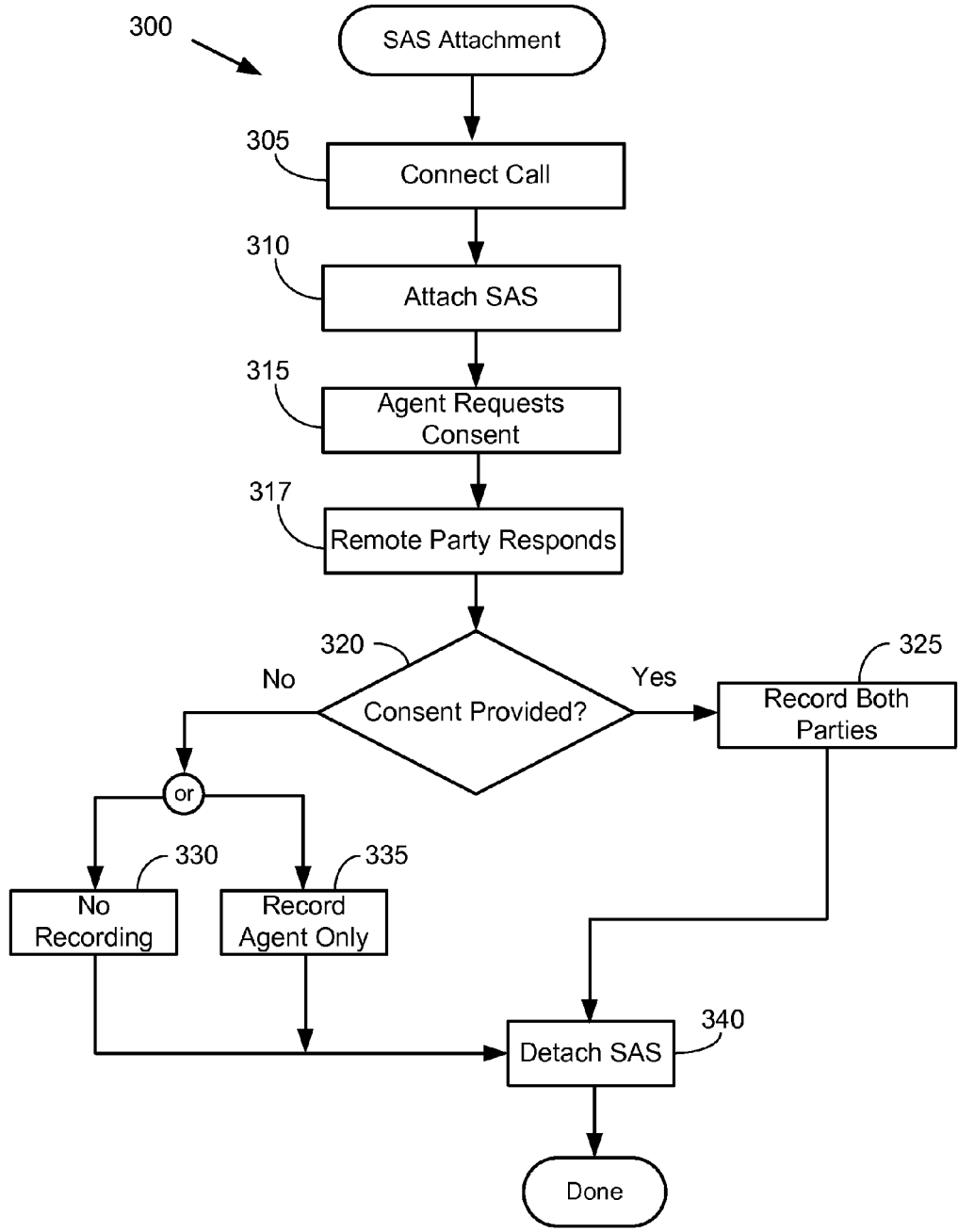
FIG. 3 illustrates one process flow for controlling a speech analytics system in conjunction with recording one or more parties on a voice call.

FIG. 3 illustrates one process flow for automating the process of determining whether consent is provided by the remote party using the SAS. The process 300 involves the SAS which selectively monitors a voice call, typically at the beginning of the call, to determine whether consent is required. The process begins in operation 305 in which the call is connected, so that a two way voice path is established between the agent and the remote party. In other embodiments, the connection may be established between the remote party and an IVR which prompts the remote party for consent. This process may be applied only for dual-consent contexts, since single-consent contexts may not require requesting consent from the remote party.

In operation 310 the SAS is attached to the call. At this point, the SAS processes the audio data, including the agent's speech and the remote party's speech. The SAS is able to distinguish (by various means) which person a communication is associated with. In some embodiments, separate channels are used to record the agent separate from the remote party. In operation 315, the agent requests consent from the remote party. In other embodiments, an automated system, such as an IVR can be used to solicit consent from the remote party. In operation 317 the remote party responds. The SAS may be used to ascertain whether consent is provided as shown in the test of operation 320. If the SAS determines that consent is provided, then the SAS in operation 325 causes recording to start of both parties. In the next operation, e.g., operation 340, the SAS is detached from the conversation. In this embodiment, the SAS is used only to determine whether consent was requested and/or provided, but in other embodiments the SAS may continue to analyze the conversation for other purposes. This allows the SAS to be used for other purposes or to analyze other conservations once consent has been determined.

If it is determined that consent is not provided in operation 320, then the SAS may cause various outcomes to occur. One option is to not record either party as shown in operation 330. Alternatively, only the agent is recorded as shown in operation 335. At this point, the SAS has completed its determination of whether consent was provided and the SAS can be detached in operation 340. The process is then completed.

Figure 4:
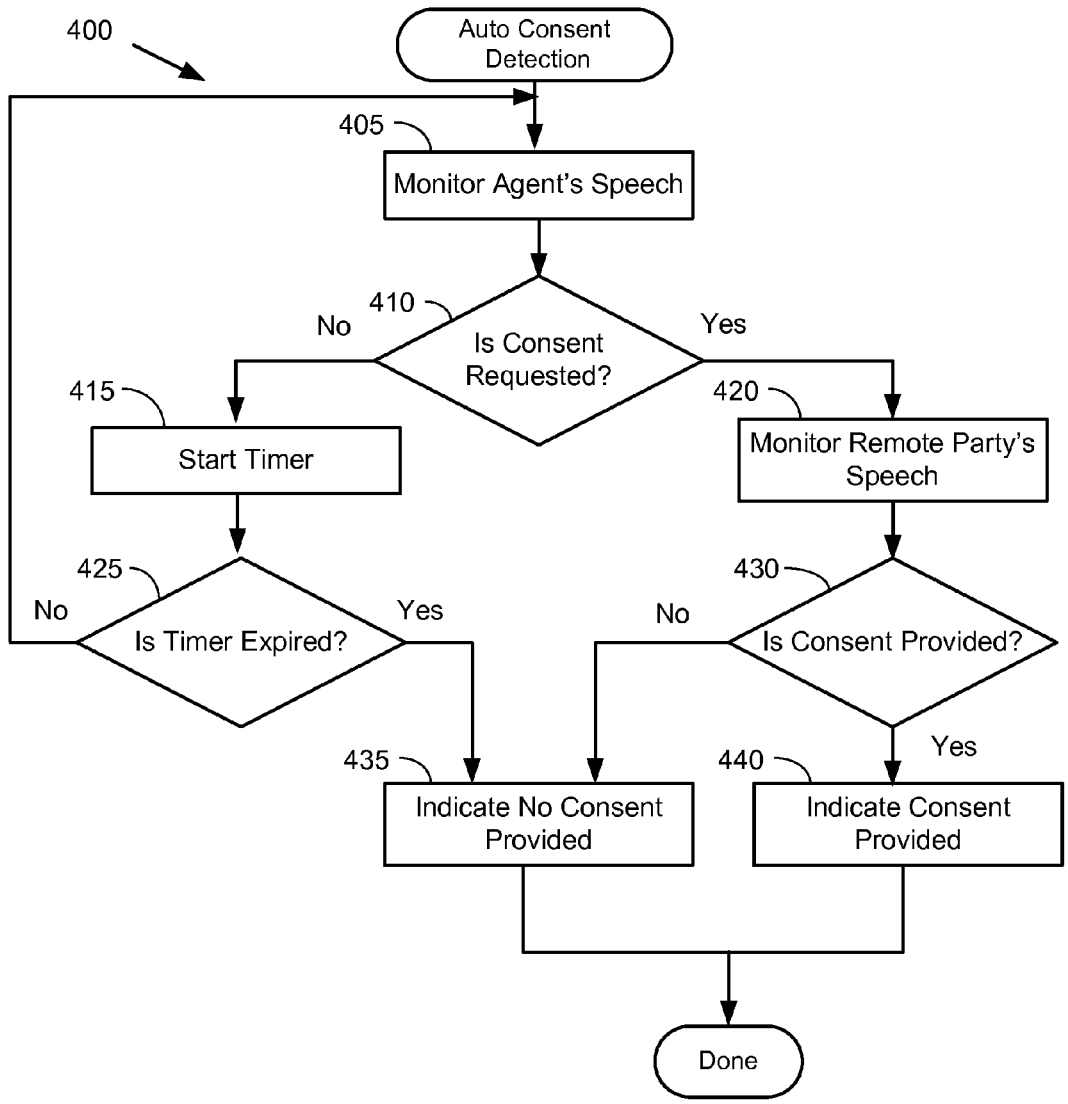
FIG. 4 illustrates one process flow for a speech analytics system to determine whether consent is provided for recording a voice call.

The determination in operation 320 of whether consent was provided in the response from the remote party is shown in greater detail in FIG. 4. The process 400 in FIG. 4 picks up at the point when the connection is established and the agent is about to request consent. This is shown in operation 405 where the speech is monitored and then analyzed by the SAS to determine if the agent has requested consent in operation 410. If no request for consent is detected in the agent's speech, then in operation 415 a timer is started. The timer is then tested in operation 425 to determine if it has expired. If so, the process loops back to operation 405 where additional speech from the agent is analyzed. If the timer expires in operation 425, then an indication is provided by the SAS that no consent was requested from the agent in operation 435. In summary, this flow essentially monitors the agent's speech at the beginning of the call to see whether consent was requested to record the call. It may be the contact center's policy that consent is to be requested at the beginning of the call, and hence a timer can be started to see whether the agent complied with the policy. If the agent has not asked for consent within the time period defined by the timer, then it is presumed that the agent will not ask for consent at all.

If consent was requested as determined in operation 410, then the SAS in operation 420 monitors the remote party's speech. If the analysis indicates in operation 430 that consent is provided, then in operation 440 the SAS provides an indication that consent was provided. If in operation 430 the remote party does not provide their consent, then the process flow continues to operation 435 where an indication is provided that no consent was provided. These indications from the SAS can be used to control whether recording should commence or not, as well as what form of recording should commence (single-party or both parties). The process flow is then completed.

This process flow may reflect how the SAS can automatically control recording in real time. This process flow can also be used when the SAS is used to verify or monitor the agent's performance in non-real time. Specifically, the SAS can be used to process a call recording to see whether the agent properly requested consent and properly initiated recording based on the response. For example, if the average consent rate is 50%, but an agent who has been connected to 100 calls has no call recordings, then this may be due to the agent failing to request consent. The agent may be ignoring contact center policies and skipping this aspect in order to handle more calls, despite that the contact center has a goal to ask every caller whether the call can be recorded. The SAS can be used to monitor the agent's compliance with the internal policies either in real time or by subsequently analyzing call recordings.

Figure 5:
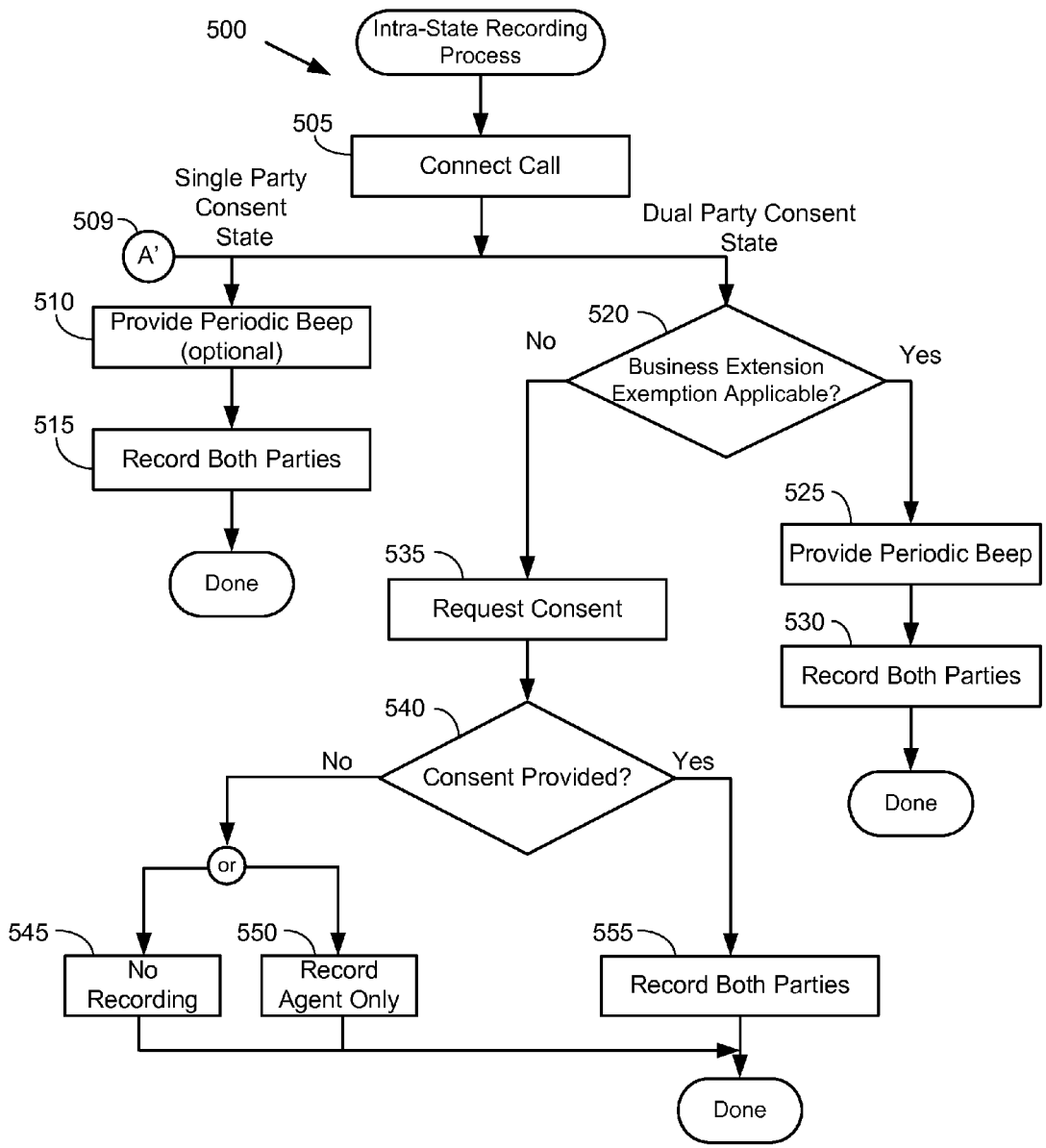
FIG. 5 illustrates one process flow associated with recording an intra-state voice call.

Another embodiment of the process flow for controlling recording is shown in FIG. 5. FIG. 5 shows a process 500 for recording calls that are intra-state. Thus, calls originating from the contact center terminate in the same state. The process begins in operation 505 with connecting the call. If the context is of a single-party consent state, then in operation 510 an optional periodic beeping sound may be provided to the remote party. This alerts the remote party that recording is occurring. Recall that in a single-party consent state, the agent may be the party providing the consent, so recording can continue without notification. Thus, the beep notification may be optional. The recording is commenced in operation 515. In this embodiment of the process flow, there is no need for requesting consent, and thus there is no need for the SAS to perform or validate this action. The SAS does not have to be attached or monitor the call.

If the call involves a dual-party consent state, a determination may occur in operation 520 whether the business extension exemption is applicable. This exemption, commonly referred to as the "business extension" exemption, may exist in a dual-party consent state. This exemption allows calls to be recorded using certain equipment, under certain conditions, and for certain purposes. This may involve, for example, recording calls for quality monitoring purposes. If the exemption applies, then a periodic beep is typically applied in operation 525. This provides a notification to the remote party that the call is being recorded. In other embodiments, the agent or an announcement may inform the remote party that the call may be recorded. In operation 530 the call is recorded, and the process is then completed.

If the business extension exemption does not apply in operation 520, then the remote party may be requested to provide consent in operation 535. The response is analyzed to determine whether consent was provided in operation 540. If consent is provided, then both parties of the call may be recorded in operation 555. If consent is not provided in operation 540, then various options are possible. Namely, either none of the parties is recorded, as shown in operation 545, or only the agent's speech is recorded, as shown in operation 550.

In the dual-consent state process flow, it is possible that the business extension exemption applies, and no requesting or confirming of consent is required. Thus, even in a dual-consent intrastate call, there may not be any need for the SAS to ascertain consent and/or verify the agent's requesting consent.

Figure 6:
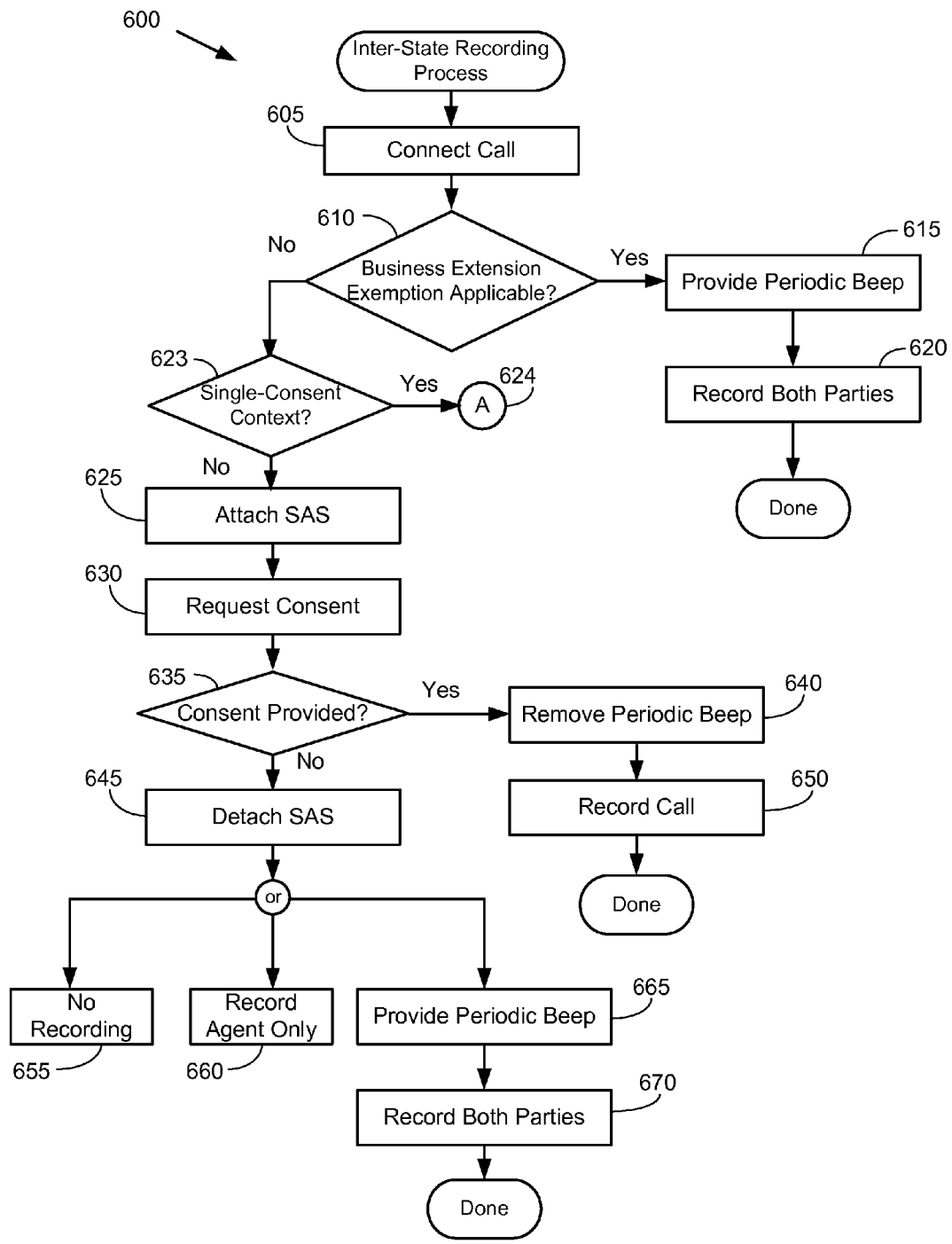
FIG. 6 illustrates one process flow associated with recording an inter-state voice call.

FIG. 6 illustrates one embodiment of a processing flow for inter-state call contexts. This process 600 begins in operation 605 with the connection of a call between the agent and the remote party. A test is made to determine for the particular states involved whether the business extension exemption is applicable in operation 610. If so, then the periodic beep is provided in operation 615 and both parties are recorded in operation 620.

If the business extension exemption is deemed to be inapplicable, then a determination is made whether both states are single-consent states. If so, then the process flow proceeds to connector A 624, which corresponds to connector A' 509 in FIG. 5.

If the determination is that a dual-party consent context is applicable in operation 623, then in one embodiment the SAS is attached to the call in operation 625. The remote party is asked for consent in operation 630, and a determination is made whether consent is provided in operation 635. This determination may involve the SAS monitoring the call. If consent is provided, then the recording beep is applied in operation 640 and the call is recorded in operation 650.

If consent is not provided, then the SAS can be detached in operation 645 since it is no longer required to ascertain whether consent is provided. At this point, various options are possible, including: not recording any party in operation 655, recording the agent only in operation 660, providing a periodic beep in operation 665, and recording both parties in operation 670. In some cases, the continuance of the call by the remote party after consent is denied or after notification of recording may instead be interpreted as implicit consent. These options reflect various possible actions, and do not necessarily imply whether the action is in conformance with applicable statutes.

Exemplary Computer Processing Device

Figure 7:
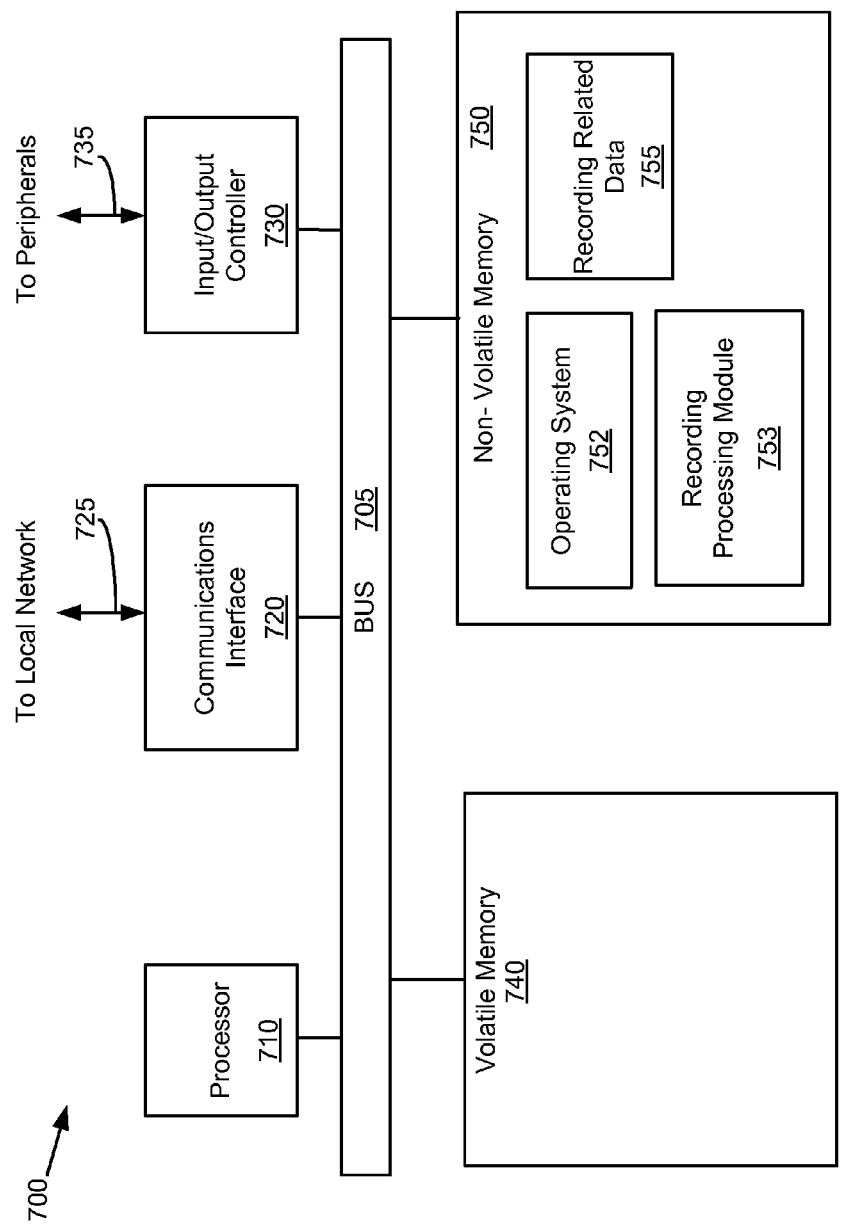
FIG. 7 illustrates one embodiment of a processing system for performing the technologies and concepts disclosed herein.

FIG. 7 is an exemplary schematic diagram of a computer processing system that may be used in embodiments of various architectures, such as the contact center architecture 100, to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 7, the processing system 700 may include one or more processors 710 that may communicate with other elements within the processing system 700 via a bus 705. The processor 710 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 720 for communicating data via a network with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 730 may also communicate with one or more input devices or peripherals using an interface 735, such as, but not limited to: a keyboard, a mouse, a touch screen/display input, microphone, pointing device, etc. The input/output controller 730 may also communicate with output devices or peripherals, such as displays, printers, speakers, headsets, banner displays, etc. These may be used, in part, to receive Administrator input, including for interacting with the manual agent selection module.

The processor 710 may be configured to execute instructions stored in volatile memory 740, non-volatile memory 750, or other forms of computer readable storage media accessible to the processor 710. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 750 may store program code and data, which also may be loaded into the volatile memory 740 at execution time. For example, for a computer processing system of a contact center 210, the non-volatile memory 750 may store one or more recording processing modules 753 that may perform the above mentioned process flows and/or operating system code 752 containing instructions for performing the process and/or functions associated with the technologies disclosed herein. The modules 753 may also access, generate, or store related data 755, including, for example, the state-related context data and other recording related data in the non-volatile memory 750, as well as in the volatile memory 740. The volatile memory 740 and/or non-volatile memory 750 may be used to store other information including, but not limited to: records, tables, applications, programs, scripts, source code, object code, byte code, compiled code, interpreted code, machine code, executable instructions, or the like. These may be executed or processed by, for example, the processor 710 and may form a part of, or may interact with, the modules 753.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for recording a voice call in a contact center comprising:
   identifying the voice call involving an agent of the contact center and a remote party communicating with the agent, the call processed by a call handling device in the contact center;
   determining by the call handling device whether the call involves a dual-consent context;
   in response to determining the voice call does not involve the dual-consent context, recording communication originating from both the agent and the remote party; and
   in response to determining the voice call does involve the dual-consent context,
   a) providing an indication to a workstation of the agent in response to determining the voice call involves the dual-consent context that the agent should verbally request consent from the remote party to record the call,
   b) prompting the remote party by the agent for consent to record the voice call,
   c) if consent is verbally received from the remote party to record the call, then recording communication originating from both the agent and the remote party, and
   d) if consent is not received from the remote party to record the call, then recording communication originating only from the agent.

2. The method of claim 1, wherein determining by the call handling device whether the voice call involves the dual-consent context comprises:
   reading a table in a memory, the table comprising at least one of an area code or a state associated with the voice call to the remote party, wherein at least one of the area code or the state is associated with a dual-consent context indicator; and
   ascertaining by a processing device using the table that the call to the remote party involves the dual-consent context based on the dual-consent context indicator associated with at least one of the area code or the state associated with the voice call.

3. The method of claim 1, further comprising the step of:
   monitoring a response from the remote party by a speech analytics system to determine whether consent is received from the remote party.

4. The method of claim 3, further comprising the step of:
   monitoring communication originating from the agent by the speech analytics system to identify a request for consent from the remote party.

5. The method of claim 3, further comprising the step of:
   ceasing the monitoring of any communication by the speech analytics system in response to determining that consent is received from the remote party.

6. The method of claim 3, further comprising the steps of:
   initiating a timer, wherein the timer is used to define a time period during which consent is determined to be provided by the remote party; and
   determining consent is provided from the remote party before an expiry of the timer.

7. A system for recording a voice call in a contact center comprising a processor configured to:
   identify the voice call involving an agent of the contact center and a remote party communicating with the agent;
   determine whether the voice call involves a dual-consent context;
   in response to determining the voice call does not involve the dual-consent context, cause communication originating from both the agent and the remote party to be recorded; and
   in response to determining the voice call does involve the dual-consent context,
   a) provide an indication to a workstation of the agent in response to determining the voice call involves the dual-consent context that the agent should verbally request consent from the remote party to record the voice call,
   b) prompt the remote party by the agent for consent to record the call, c) if consent is verbally received from the remote party to record the voice call, then cause communication originating from both the agent and the remote party to be recorded, and
d) if consent is not received from the remote party to record the voice call, then cause communication originating only from the agent to be recorded.

8. The system of claim 7, wherein the processor is further configured to:
   read a table in a memory, the table comprising at least one of an area code or a state associated with the call to the remote party, wherein at least one of the area code or the state is associated with a dual-consent context indicator; and
   ascertain by using the table whether the call to the remote party involves the dual-consent context based on the dual-consent context indicator associated with at least one of the area code or the state associated with the voice call.

9. The system of claim 7, further comprising a speech analytics system, the speech analytics system comprising a second processor configured to:
   monitor a response from the remote party to determine whether consent is received from the remote party.

10. The system of claim 9, wherein the second processor of the speech analytics system is further configured to:
    monitor communication originating from the agent to identify a request for consent from the remote party.

11. The system of claim 9, wherein the second processor of the speech analytics system is further configured to:
    cease monitoring any communication in response to determining that consent is received from the remote party.

12. The system of claim 7, wherein the processor is further configured to:
    initiate a timer, wherein the timer is used to define a time period during which consent is determined to be provided by the remote party; and
    determine the remote party has provided consent before an expiry of the timer.

13. A non-transitory tangible computer readable storage medium comprising device-executable instructions for determining how to record a voice call in a contact center, the device-executable instructions being configured to cause a processor to:
    identify the voice call involving an agent of the contact center and a remote party communicating with the agent;
    determine whether the voice call involves a dual-consent context;
    in response to determining the voice call does not involve the dual-consent context, cause the communication originating from both the agent and the remote party to be recorded; and
    in response to determining the voice call does involve the dual-consent context,
    a) provide an indication to a workstation of the agent in response to determining the call involves the dual-consent context that the agent should verbally request consent from the remote party to record the call,
    b) process a first indication provided as input by the agent indicating that consent was received from the remote party in response to the agent verbally prompting the remote party,
    c) if the first indication indicates consent was received from the remote party, then cause communication originating from both the agent and the remote party to be recorded, and
    d) if the first indication indicates consent was not received from the remote party to record the voice call, then cause communication originating only from the agent to be recorded.

14. The non-transitory tangible computer readable storage medium of claim 13, wherein the instructions further cause the processor to:
    read a table from a memory, the table comprising at least one of an area code or a state associated with the call to the remote party, wherein at least one of the area code or the state is associated with a dual-consent context indicator; and
    ascertain by using the table that the call to the remote party involves the dual-consent context based on the dual-consent context indicator associated with at least one of the area code or the state associated with the voice call.

15. The non-transitory tangible computer readable storage medium of claim 13, wherein the instructions further cause the processor to:
    analyze a second indication received from a speech analytics system monitoring audio data of a response from the remote party to determine whether consent is received from the remote party.

16. The non-transitory tangible computer readable storage medium of claim 13, wherein the instructions further cause the processor to:
    transmit a third indication to a speech analytics system to initiate monitoring of communication originating from the agent to determine whether a request for consent is provided by the agent to the remote party.

17. The non-transitory tangible computer readable storage medium of claim 13, wherein the instructions further cause the processor to:
    initiate a timer, wherein the timer is used to define a time period during which consent is determined to be provided by the remote party; and
    if no indication of consent has been received before expiry of the timer, then determine that consent has not been provided from the remote party.

* * * * *